United States Patent [19]

Tanaka et al.

[11] Patent Number: 4,779,158

[45] Date of Patent: Oct. 18, 1988

[54] DISC CARTRIDGE

[75] Inventors: Kimio Tanaka; Haruo Shiba, both of Nagano, Japan

[73] Assignee: TDK Corporation, Japan

[21] Appl. No.: 942,493

[22] Filed: Dec. 16, 1986

[30] Foreign Application Priority Data

Dec. 18, 1985 [JP] Japan .............................. 60-194556[U]

[51] Int. Cl.$^4$ ............................................. G11B 23/03
[52] U.S. Cl. ................................................... 360/133
[58] Field of Search ................ 360/133; 369/272, 291; 206/444; 242/199

[56] References Cited

U.S. PATENT DOCUMENTS 4,660,118 4/1987 Faber .................................. 360/133

Primary Examiner—A. J. Heinz
Attorney, Agent, or Firm—Steinberg & Raskin

[57] ABSTRACT

A disc cartridge capable of preventing deformation and outward expanding of a shutter for openably covering windows of casing. The disc cartridge includes a shutter of which distal ends each are inwardly bent into a L-shape and upper and lower cover plates each of which has a U-shaped recess for slidably receiving the step therein and a tongue-like stopper hanging over the recess. The recess and stopper cooperate to constantly slidably interpose each of the steps of the shutter therebetween to prevent any deformation of the shutter.

18 Claims, 6 Drawing Sheets

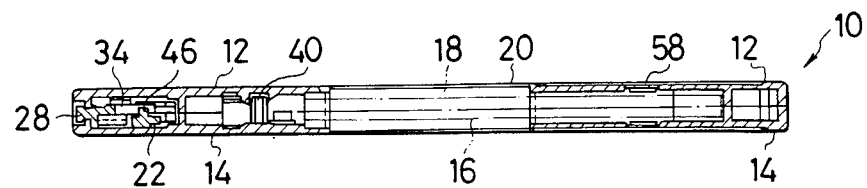
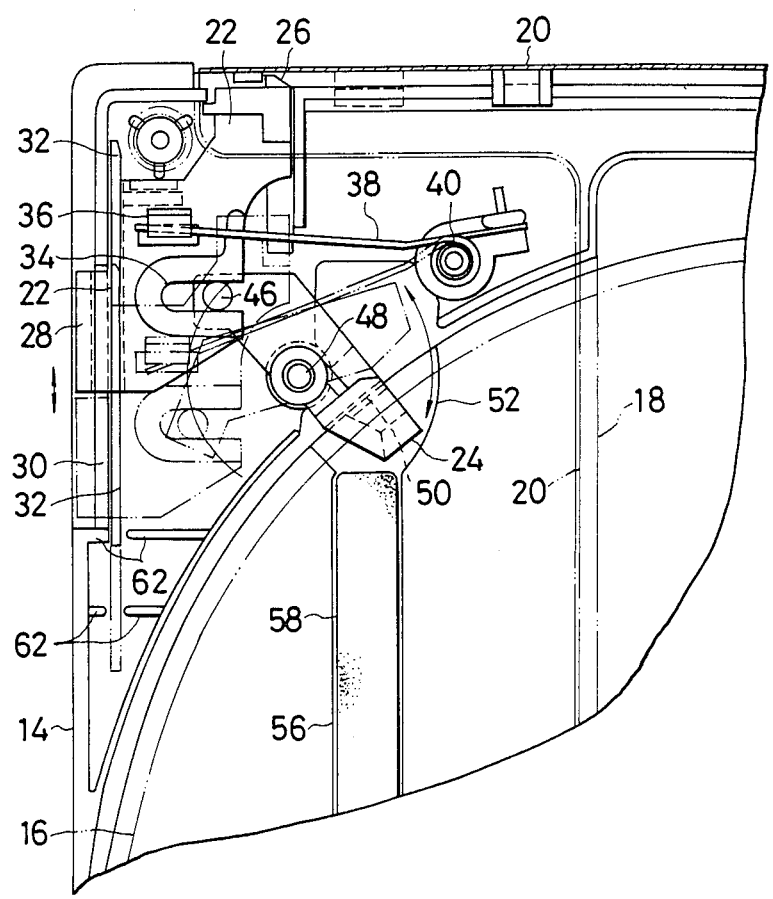

DISC CARTRIDGE

BACKGROUND OF THE INVENTION

This invention relates to a disc cartridge, and more particularly to a disc cartridge which has a hard disc, particularly, a double-sided type hard disc housed in a casing.

In general, a disc-type data recording carrier such as a compact disc (CD), a video disc (LD) or the like is used in a manner to be removed from a packing case and set in recording and/or reproducing equipment.

Conventionally, it has been desirable to protect such a disc type recording carrier from environment because it is not only readily covered with dust and damaged but adversely affected due to a variation in temperature. For this purpose, the use of an envelope such as a tray, a casing or the like has been proposed to protect the disc. Unfortunately, such a conventional envelope is not suitable for the protection of a double-sided hard disc, because the housing of the disc in a storage space defined in the envelope causes the disc to be contacted with the envelope. Also, the envelope causes the disc to be contacted with an inner surface thereof during the storage or transportation. Thus, the use of the envelope results in damage and/or pollution of the disc as well as the exposure of the disc to a variation in temperature. Further, when a shutter provided at the conventional envelope to operate a window for inserting a disc driving mechanism of a disc player such as a recording and/or reproducing head therethrough into the disc cartridge is increased in length, any deformation of the shutter such as the outward expansion or the like readily occurs at the shutter during the processing. In order to avoid such a disadvantage, it is proposed to reinforce the shutter by bonding a specific part thereto by ultrasonic sealing or the like. Unfortunately, this fails to provide the envelope with high dimensional accuracy and renders the manufacturing cost significantly high. Also, this has another disadvantage of causing the handling of the disc cartridge to be highly troublesome.

Accordingly, it would be highly desirable to provide a disc cartridge which is capable of keeping a shutter at a correct posture and preventing any deformation of the shutter to ensure the smooth operation of the disc cartridge and the safe housing of a disc in a casing.

SUMMARY OF THE INVENTION

Briefly speaking, in accordance with the present invention, a disc cartridge is provided. The disc cartridge includes a casing comprising an upper cover plate and a lower cover plate joined together to define a space therein, in which a disc is rotatably housed. At least one of the upper and lower cover plates is provided a window for inserting a disc driving mechanism of a disc player such as a recording and/or reproducing head therethrough into the disc cartridge. Also, the disc cartridge includes a shutter arranged to operate the window. The casing is provided therein with an actuator which is adapted to releasably lock the shutter. The shutter is generally formed into a substantially U-shape and slidably fitted on the casing. The shutter is provided at each of distal ends thereof with a step and correspondingly the casing is formed with a recess for slidably fitting the step therein. Also, the casing is provided with a stopper for preventing the step from being vertically disengaged from the recess of the casing.

Accordingly, it is an object of the present invention to provide a disc cartridge which is capable of holding a shutter at a stable and correct posture with respect to the disc cartridge.

It is another object of the present invention to provide a disc cartridge which is capable of constantly keeping a shutter at a correct posture to accomplish smooth operation of the shutter.

It is a further object of the present invention to provide a disc cartridge which is capable of preventing any deformation of a shutter to ensure smooth operation of the disc cartridge and safely house a disc in a casing.

It is still another object of the present invention to provide a disc cartridge which is capable of ensuring smooth operation of a shutter without any specific parts while providing the cartridge with high dimensional accuracy.

It is yet another object of the present invention to provide a disc cartridge which is capable of accomplishing the above-noted objects with a simple structure.

Still other objects and advantages of the invention will in part be clear and will in part be apparent from the specification.

The invention accordingly comprises the features of construction, combination of elements, and arrangement of parts which will be exemplified in the construction hereinafter set forth.

BRIEF DESCRIPTION OF THE DRAWINGS

For a fuller understanding of the invention, reference is made to the following description taken in connection with the accompanying drawings in which like reference numerals designate like or corresponding parts throughout; wherein:

FIG. 2 is a sectional view taken along line II—II of FIG. 1;

FIG. 3 is partly enlarged view showing an actuating section of the disc cartridge shown in FIG. 1;

DETAILED DESCRIPTION OF THE PREFERRED EMBODIMENT

Now, a disc cartridge according to the present invention will be described hereinafter with reference to the accompanying drawings.

Figure 1:
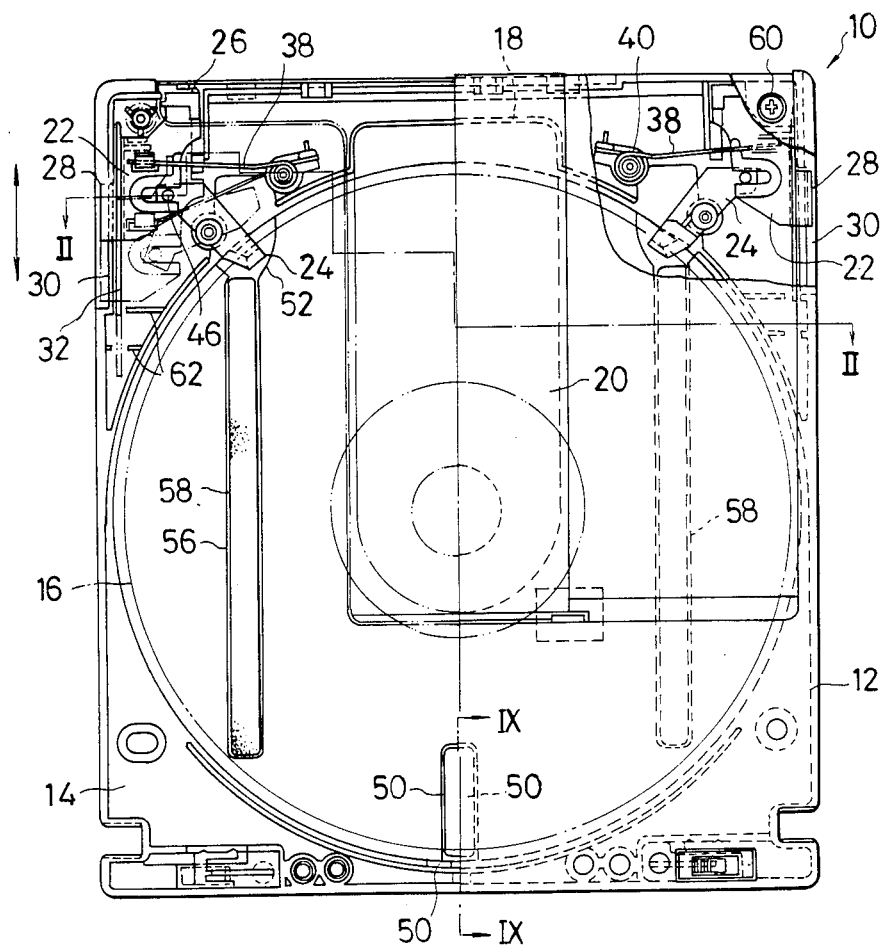
FIG. 1 is a partly cutaway plan view showing an embodiment of a disc cartridge according to the present invention.

FIG. 1 shows an embodiment of a disc cartridge according to the present invention.

A disc cartridge of the illustrated embodiment, as shown in FIGS. 1 to 3, includes a casing 10 comprising an upper cover plate 12 and a lower cover plate 14 joined together so as to define a space therein, and a disc 16 received or housed in the casing 10. The casing 10 is formed with at least a window 18 for inserting a disc driving mechanism of a disc player (not shown) such as a recording and/or reproducing head therethrough into the casing 10. In the illustrated embodiment, the upper and lower cover plates 12 and 14 each are provided with the window 18. The windows 18 are operated by a shutter 20. Also, the disc cartridge includes a pair of actuators 22 arranged in the casing 10 for releasably locking the shutter 20 and a disc receiver 24 provided in the casing 10 and operatively connected to or engaged with each of the actuators 22. The disc receiver 24 is adapted to selectively receive a part of a peripheral portion of the disc 16 or a part of each of upper and lower surfaces and a peripheral end surface of the disc 16, as described hereinafter. The actuator 22 is arranged to be slidable in a longitudinal direction of the cartridge indicated by arrows in FIGS. 1 and 3, and the disc receiver 24 is adapted to be approachably moved with respect to the disc 16 when the actuator 22 is slidably moved; so that when the shutter 20 is actuated to close the window 18, the disc receiver 24 may be engaged with the disc 16 or insert therein a part of the disc to force it toward a rear side end of the casing 10 while holding it at the center of the casing in a width direction of the casing, to thereby keep it at a state of floating in the space defined in the casing 10, whereas when the shutter 20 is actuated to open the window 18, the disc receiver 24 may be disengaged from the disc 16 to prepare the disc for engagement with a disc driving mechanism of a disc player which is then inserted through the opened window into the cartridge.

Figure 4:
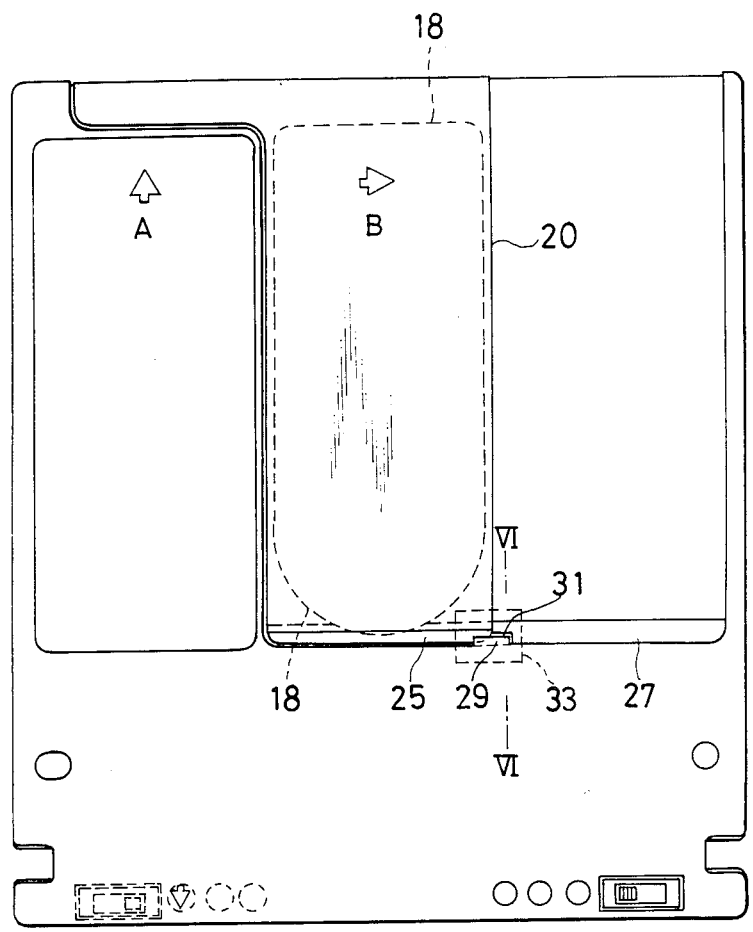
FIG. 4 is a plan view of the disc cartridge shown in FIG. 1.
Figure 5:
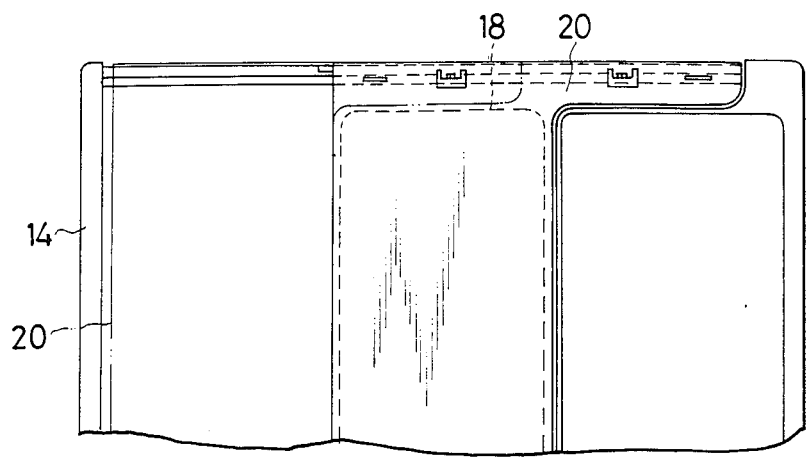
FIG. 5 is a fragmentary bottom view showing a part of a bottom section of the disc cartridge shown in FIG. 1.
Figure 6:
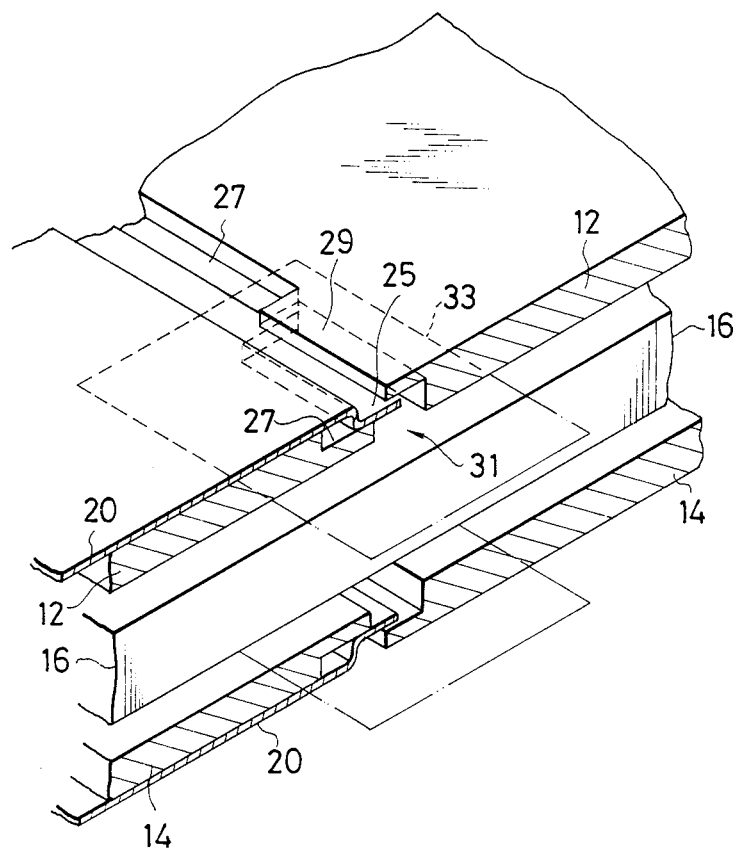
FIG. 6 is a perspective sectional view taken along line VI—VI of FIG. 4.

In the illustrated embodiment, the shutter 20 for covering the windows 18 comprises a plate member of a substantially U-shape which is movably fitted on the casing 10 so as to be slidable along the upper and lower cover plates 12 and 14 in a direction indicated at an arrow B in FIG. 4. The shutter 20 is formed with each of distal ends thereof with a step 25 extending in a sliding direction of the shutter 20. In the illustrated embodiment, the steps 25, as clearly shown in FIG. 6, each are formed so as to horizontally extend in a lateral direction of the casing by inwardly bending the distal end of the shutter into a substantially L-shape. Corresponding to the steps 25, the upper and lower cover plates 12 and 14 of the casing 10 each are provided with a substantially U-shaped recess 27 which horizontally extends in the lateral direction of the casing to slidably receive the corresponding L-shaped step 25 of the shutter 20 therein. Also, the upper and lower cover plates 12 and 14 are formed with tongue-like stoppers 29, each of which is arranged in a manner to hang over the U-shaped recess 27. The stoppers 29 are positioned opposite to each other and arranged to be constantly engaged with the steps 25 irrespective of any position of the steps or irrespective of sliding movement of the shutter 20. In the illustrated embodiment, each of the stoppers 29, as shown in FIG. 4, is positioned to be engaged with a forward side end of the step based on the sliding direction B of the shutter 20 as shown in FIG. 4 when the shutter closes the windows. Also, the stoppers 29 each are formed to vertically interpose the steps 25 therebetween to cause the shutter to be horizontally and laterally slided in a manner to be guided constantly along the stoppers 29. Thus, the steps each are at a state of being constantly interposed between the recess 27 and the stopper 29. The recess 27 is formed at a portion opposite to the stopper with a cutout or through-hole 31 corresponding in shape to and somewhat larger than the stopper 29. Accordingly, the stoppers 29 are arranged directly opposite to each other. The cutout 31 is for the purpose of facilitating forming of the tonguelike stopper by molding. The cutout may be closed with a suitable means 33 such as an adhesive tape.

A pair of the actuators 22, as shown in FIG. 1, are formed so as to be symmetrical with each other and arranged adjacent to both sides of a front portion of the casing 10 in a manner to be not only opposite to each other but symmetrical along a longitudinal axis of the cartridge and slidable with respect to the casing 10. Also, the actuators each serves as an actuating lever to actuate operation sections of the disc cartridge. More particularly, each of the actuators 22, as shown in FIG. 3, is provided at a front end thereof with lock means 26, which comprise, in the illustrated embodiment, a hook-like member integrally formed at the front end of the actuator 22 and securely engaged with the shutter 20. The actuator 20 is also provided on one side or an outer side thereof with actuating means 28 which comprise, in the illustrated embodiment, a projection integrally formed on the outer side of the actuator and outwardly extending through a horizontally extending cutout or slot 30 formed at a side wall of the casing 10. Also, the actuator 22 has cover means 32 integrally provided on the one side thereof so as to extend in a longitudinal direction thereof. In addition, the actuator 22 is formed on the other side or an inner side thereof with a guide groove 34 of a substantially U-shape which serves as movement transmission means for transmitting sliding movement of the actuator to the disc receiver 24 as described hereinafter. Further, the actuator 22 is provided on an upper surface thereof with a spring bearing member 36 as shown in FIG. 3 which is engaged with one end of a spring 38 held at the other end thereof on a spring holder 40 fixed on the casing 10, so that the actuator 22 may be constantly forced toward a front end of the casing 10.

Figure 7:
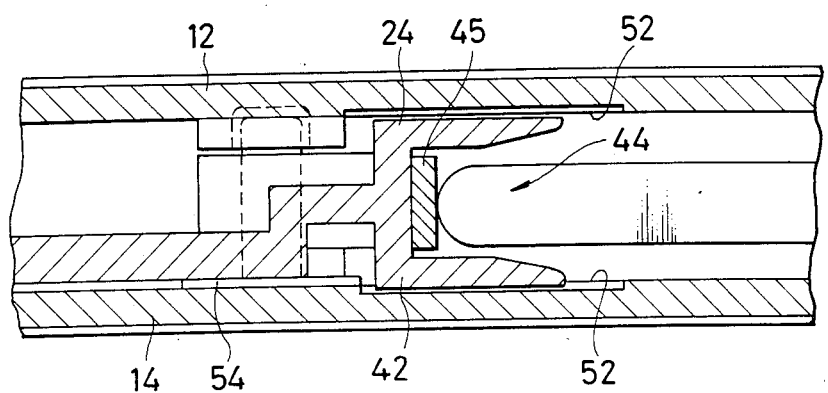
FIG. 7 is a sectional view showing a receiver body of a disc receiver.
Figure 8:
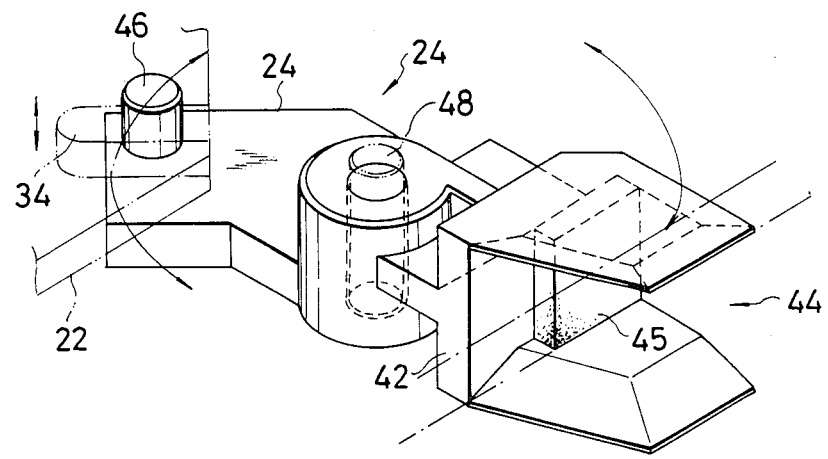
FIG. 8 is a perspective view showing a disc receiver.

Likewise, a pair of the disc receivers 24, as shown in FIG. 1, are formed in a manner to be symmetrical with each other. Each of the disc receivers 24 is generally formed into a liver-like shape as shown in FIGS. 1, 3 and 8 and provided at one end thereof with a receiver body 42. The receiver body 42, as shown in FIGS. 7 and 8, is formed into a substantially sideways U-shape to define therein a recess designated at reference numeral 44. The recess 44 is provided on an end surface thereof contacting with a peripheral end portion of the disc 16 with a elastic member 45 to prevent unsteadiness and/or damage of the disc 16 in the disc receiver 24. The elastic member 45 may be formed of rubber or a soft plastic material such as polyethylene, polypropylene or vinyl chloride. Such an elastic member may be arranged on upper and lower surfaces of the recess 44 of the receiver body 42. The recess 44 of the receiver body 42, as shown in FIG. 7, is preferably formed in a manner such that an opened end portion or inlet portion thereof is vertically enlarged so as to facilitate the insertion and removal of a disc 16 with respect to the recess 44.

The so-formed receiver body 42 is positioned adjacent to a peripheral portion of the disc 16 to selectively receive a part of the peripheral portion in the recess 44 depending upon the sliding movement of the actuator as indicated at solid lines and two-dot chain lines in FIGS. 1 and 3 and also act as an elevator for lifting the disc 16. More particularly, the disc receiver 24 is also provided at the other end thereof with a guide pin 46 acting as operative connection means, which is loosely fitted in the guide groove 34 of the actuator 22 to operatively connect the disc receiver 24 to the actuator 22. The disc receiver 24 is movably supported at a middle portion thereof on a pivot pin 48 so as to be rotatable about the pin 48 and vertically movable along the pin 48.

In the illustrated embodiment, the guide pin 46 is provided at the disc receiver 24 and the guide groove 34 is formed at the actuator 22. However, the guide pin 46 and guide groove 34 may be provided at the actuator 22 and disc receiver 24, respectively.

Also, in the illustrated embodiment, the spring 38 may comprise a coiled spring stretchedly arranged in the sliding direction of the actuator 22 or between the disc receiver 24 operatively connected to the actuator 22 and the casing 10. Alternatively, it may comprise a coiled spring wound on the pivot pin 48 of the disc receiver 24. Each of such constructions causes the actuator 22 to be forced toward the front end of the casing 10.

Figure 9:
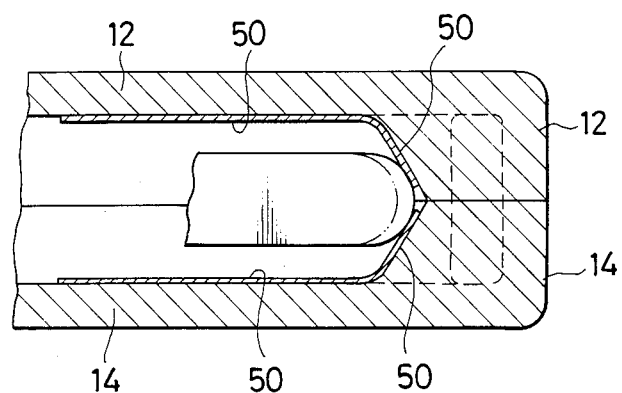
FIG. 9 is a sectional view taken along line IX—IX of FIG. 1.

Further, in the illustrated embodiment, the casing 10 is formed at a rear end thereof into a substantially sideways V-shape as shown in FIG. 9, so that the rear end may be tapered. Such construction facilitates the positioning of the disc 16 at the center of the casing 10 in a width direction of the casing because the positioning is carried out while the disc 16 is guided along the tapered rear end. This results in the disc 16 being located at positions indicated at two-dot chain lines and solid lines in FIG. 9 when the disc cartridge is charged in a disc player and removed therefrom, respectively. Also, the casing 10 may have a disc holding material 50 applied to the tapered rear end thereof to ensure the safety and smooth operation of the disc in the casing 10. For this purpose, the disc holding material 50 is preferably a material which is capable of exhibiting lubricating properties, such as ultra-high-molecular-weight polyethylene, ultra-high-molecular-weight polyethylene foam, PET, metal sheet such as stainless steel and the like. Such a material likewise may be applied to portions of the casing 10 adjacent to the tapered rear end as shown in FIG. 9.

The casing 10, as shown in FIGS. 1 and 3, is formed on each of upper and lower surface sections of an inner surface thereof with a pair of recesses 52 so as to positionally correspond to the disc receivers 24. The recess 52 serves to ensure the smooth movement of the disc receiver. The disc receiver 24 is supported on a holder 54. Also, the bottom surface of the casing 10 is formed with a pair of elongated grooves 56, on each of which a sheet 58 exhibiting lubricating properties is sticked. Reference numerals 60 and 62 designate bolts and ribs, respectively.

Now, the manner of operation of the disc cartridge of the illustrated embodiment constructed as described above will be described hereinafter with reference to FIGS. 1 to 9.

When the disc cartridge is inserted in a disc player (not shown) for the operation in a direction indicated at an arrow in FIG. 4, the actuating means or projection 28 of the actuator 22 projecting through the cutout or slot 30 of each of the side walls of the casing 10 are/is engaged with a projection provided at an insertion port of the disc player to be rearwardly slided in the slot 30 along the slot 30 against the spring 38 and the cover means 32 sealedly cover the slot 30 of the casing 10. The sliding of the projection 28 causes the shutter 20 to be released from the lock means or hook-like member 26, so that the shutter 20 may be moved in a direction of opening the windows 18 or in the direction indicated at the arrow B in FIG. 4 by means of a shutter actuating mechanism of the disc player while the L-shaped steps 25 are constantly engaged with the tongue-like stoppers 29. Concurrently, the disc receiver 24 is pivotally moved about the pivot pin 48 due to the sliding of the actuator 22 to release the disc 16 from the recess 44, resulting in the disc 16 being safely supported on the lubricating sticked sheets 58 and then operatively engaged with a disc driving mechanism of the disc player.

When the disc cartridge is to be removed from the disc player, the disc 16 is first disengaged from the disc driving mechanism of the disc player to be put on the lubricating sticked sheets 58 and then the shutter 20 is moved in a direction of closing the windows 18 by means of the shutter actuating mechanism of the disc player while the steps 25 are engaged with the stoppers 29. Then, the disc cartridge is removed from the disc player, so that the actuator 22 may be slided toward the front end of the disc cartridge by means of the spring 38 to actuate the disc receiver 24, to thereby fit a part of the disc 16 in the receiver body 42. This results in the disc 16 being forced toward the rear end of the casing 10 while being held at a state of floating in the the space defined in the casing 10. Simultaneously, the lock means 26 of the actuator 22 is actuated to keep the shutter 20 closed. During the whole operation of the disc cartridge, the cover means 32 thoroughly and sealedly cover the slot 30 of the casing to prevent dust or the like from entering the casing.

As can be seen from the foregoing, the present invention is constructed in the manner that the shutter of a substantially U-shape is provided at each of the distal ends thereof with the L-shaped step and correspondingly the upper and lower cover plates each are formed with the recess and the tongue-like stopper between which each of the steps is constantly interposed while being engaged with the stopper. Thus, the present invention effectively prevents deformation and outward expanding of the distal ends of the shutter to ensure smooth operation of the shutter even when dimensions of the shutter are increased. Also, this is accomplished without using any specific parts, so that the disc cartridge may be provided with high dimensional accuracy and manufactured at low costs. Also, the present invention prevents dust or the like from entering the disc cartridge the disc from being contacted with the casing, to thereby keep the disc safe.

It will thus be seen that the objects set forth above, among those made apparent from the preceding description, are efficiently attained and, since certain changes may be made in the above construction without departing from the spirit and scope of the invention, it is intended that all matter contained in the above description or shown in the accompanying drawings shall be interpreted as illustrative and not in a limiting sense.

What is claimed is:

1. A disc cartridge comprising:
    a casing comprising an upper cover plate and a lower cover plate joined together to define a space therein;
    a disc rotatably housed in said space of said casing;
    a shutter for exposing at least one window provided in said casing to insert a disc drive mechanism of a disc player therethrough into said disc cartridge; and actuator means slidably arranged in said casing and engaged with said shutter to releasably lock said shutter;

said shutter being formed into a substantially U-shaped configuration with arms of the U-shape being substantially of equal length to be slidably fitted on said casing and provided at distal ends thereof with steps;

said upper and lower cover plates each being formed with a recess for slidably receiving each of said steps of said shutter and a stopper which is positioned to constantly interpose said step between said recess and said stopper.

2. A disc cartridge as defined in claim 1, wherein said steps are each formed to extend in a sliding direction of said shutter.

3. The cartridge of claim 2, wherein each said step extends substantially along the entire distal end of said shutter.

4. A disc cartridge as defined in claim 1, wherein said stopper is formed into a tongue-like shape.

5. A disc cartridge as defined in claim 4, wherein said stopper is arranged to hang over said recess.

6. A disc cartridge as defined in claim 5, wherein said steps of said shutter are each formed into a substantially L-shape by inwardly bending each of said distal ends of said shutter and said recess of said cover plate is formed into a substantially U-shape.

7. A disc cartridge as defined in claim 1, wherein said stoppers of said upper and lower cover plates are arranged opposite to each other.

8. A disc cartridge as defined in claim 7, wherein said stoppers of said upper and lower cover plates are directly opposite to each other via through-holes provided at both recesses of said cover plates during molding of said cover plates, whereby formation of said stoppers on said plates during said molding is facilitated.

9. The cartridge of claim 8, wherein each said through-hole is closed.

10. The cartridge of claim 1, wherein each said stopper is outwardly positioned with respect to said shutter step and said respective recess.

11. The cartridge of claim 10, wherein said shutter is slidably mounted upon said casing to slide along said upper and lower cover plates.

12. The cartridge of claim 11, wherein each said stopper projects in a direction substantially perpendicular to a sliding direction of said shutter.

13. The cartridge of claim 1, wherein each said step and respective stopper are formed to constantly engage one another, irrespective of sliding movement or position of said shutter.

14. The cartridge of claim 1, additionally comprising an inward depression extending along said respective distal end of said shutter.

15. The cartridge of claim 1, wherein said steps, stoppers, and recesses together constitute means for constantly and reliably guiding the sliding of said shutter.

16. The cartridge of claim 1, wherein said shutter, with said steps, is substantially symmetrical when viewed in a sliding direction thereof.

17. The cartridge of claim 1, wherein each said recess is formed on an outer surface of said casing, so that contaminants are prevented from entering said space housing said disc through said casing.

18. The cartridge of claim 17, additionally comprising at least one lateral slot in a side wall of said casing, and said actuating means comprise a projection slidingly projecting through said lateral slot, and covering means integrally provided on said actuating means for constantly, sealedly covering said lateral slot, to prevent any contaminants from entering said casing.

* * * * *